United States Patent
Frost

(10) Patent No.: US 11,597,522 B2
(45) Date of Patent: Mar. 7, 2023

(54) VERTICALLY STOWED PADDED TRAY TABLE FOR PASSENGER SEAT

(71) Applicant: B/E Aerospace, Inc., Winston-Salem, NC (US)

(72) Inventor: Ian L. Frost, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 47 days.

(21) Appl. No.: 17/233,718

(22) Filed: Apr. 19, 2021

(65) Prior Publication Data
US 2021/0331804 A1 Oct. 28, 2021

Related U.S. Application Data

(60) Provisional application No. 63/015,233, filed on Apr. 24, 2020.

(51) Int. Cl.
*B64D 11/06* (2006.01)

(52) U.S. Cl.
CPC ...... *B64D 11/0638* (2014.12); *B64D 11/0696* (2013.01)

(58) Field of Classification Search
CPC .......................... B64D 11/0638; B64D 11/0696
See application file for complete search history.

(56) References Cited

U.S. PATENT DOCUMENTS

| | | | | |
|---|---|---|---|---|
| 3,583,760 A | * | 6/1971 | McGregor | B64D 11/0638 297/145 |
| 4,372,604 A | * | 2/1983 | Raksanyi | B61D 33/005 297/145 |
| 4,852,940 A | | 8/1989 | Kanigowski | |
| 4,944,552 A | | 7/1990 | Harris | |
| 5,106,156 A | | 4/1992 | Marquis | |
| 8,979,189 B2 | | 3/2015 | Henshaw et al. | |
| 9,102,410 B2 | | 8/2015 | Frost et al. | |
| 9,216,665 B2 | | 12/2015 | Herault | |
| 9,371,026 B2 | | 6/2016 | Chang et al. | |

(Continued)

FOREIGN PATENT DOCUMENTS

DE 102004061471 A1 7/2006
DE 102017111855 A1 12/2017
(Continued)

OTHER PUBLICATIONS

EP Search Report for European Application No. 21170531.4 dated Sep. 3, 2021, 6 pages.

*Primary Examiner* — Anthony D Barfield
(74) *Attorney, Agent, or Firm* — Suiter Swantz pc llo

(57) ABSTRACT

A passenger seat or group of seats includes a tray table set into the armrest on either side of the associated seat, the tray table capable of translating lengthwise along the armrest and pivoting between a stowed configuration and a deployed configuration. In the stowed configuration, the tray table extends vertically above the armrest and may be stowed between (and partially behind) the associated seat and an adjacent seat, serving as a partial barrier between the two seats. In the deployed configuration, the tray table extends horizontally across the associated seat for use by the occupying passenger. The tray table is padded on its underside to provide the passenger with head and shoulder support when in the stowed configuration.

10 Claims, 8 Drawing Sheets

(56) References Cited

U.S. PATENT DOCUMENTS

2003/0094843 A1\* 5/2003 Jensen .................. 297/391
2015/0321592 A1 11/2015 Morais
2019/0061955 A1 2/2019 Wilson et al.

FOREIGN PATENT DOCUMENTS

EP 1636087 B1 4/2007
EP 3305663 A1 4/2018
WO 2013144845 A2 10/2013

\* cited by examiner

VERTICALLY STOWED PADDED TRAY TABLE FOR PASSENGER SEAT

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/015,233 entitled VERTICALLY STOWED PADDED TRAY TABLE FOR PASSENGER SEAT and filed Apr. 24, 2020;

Said U.S. Provisional Patent Application 63/015,233 is herein incorporated by reference in its entirety.

TECHNICAL FIELD

The subject matter disclosed by the instant application is directed generally to aircraft interiors and more particularly to accessories for passenger seats.

BACKGROUND

Economy-class passenger seating generally involves groups of two to five seats in relatively close proximity. Such grouped seats often provide little opportunity for privacy from passengers in adjacent seats, and rarely provide head or shoulder support beyond headrests integrated into the seatbacks.

SUMMARY

In a first aspect, a passenger seat with a vertically stowed tray table is disclosed. In embodiments, the passenger seat includes a seat frame and seatback collectively accommodating a passenger (e.g., via a seat cushion supported by the seat frame). The passenger seat includes armrests on the left and right side. The passenger seat includes, attached to either the left-side or right-side armrest, a tray table stowable in a substantially vertical configuration, e.g., between the seatback and the seatback of an adjacent passenger seat (wherein the tray table may serve as a partial barrier between seats). The tray table attaches to the armrest via an extender which allows for space between the tray table and the armrest when in the stowed configuration. The tray table translates along the length of the armrest and pivots between the stowed configuration and a deployed configuration (e.g., wherein the tray table extends horizontally across the seat for passenger use). The tray table is partially padded on its underside to provide support to the occupying passenger when stowed.

In some embodiments, the armrest includes a runner bar or slide bar extending along its length from a back end to a forward end. For example, the tray table and extender may be attached to the armrest via bushings which translate lengthwise along the slide bar.

In some embodiments, the tray table pivots between the stowed and deployed configurations when the bushing reaches the forward end of the slide bar.

In some embodiments, the padded underside of the tray table provides head and shoulder support to the passenger when stowed.

In some embodiments, the tray table is partially blocked or obscured between the passenger seat and an adjacent passenger seat (e.g., extending back between the two adjacent seats) when stowed.

In some embodiments, the space between the tray table and the armrest can accommodate a passenger's elbow.

In some embodiments, the tray table pivots between stowed and deployed configurations by rotating relative to a lengthwise axis aligned with the armrest.

A passenger seating assembly is also disclosed. In embodiments, the passenger seating assembly includes support frames and seatbacks for a group of passenger seats (e.g., a group of two to five adjacent seats), each seat accommodating a passenger. The seating assembly includes armrests attached to the support frames or seatbacks, e.g., such that each individual seat has a left and right armrest but each armrest is attached to only one seat. For each individual seat, an armrest (on the left or right side) includes a tray table stowable in a substantially vertical configuration, e.g., between the seatback and the seatback of an adjacent passenger seat (where the tray table may serve as a barrier). The tray table is slidably attached to the armrest via an extender which allows for elbow space between the tray table and the armrest when in the stowed configuration. Each tray table translates lengthwise along the armrest and pivots between the stowed configuration and a deployed configuration, wherein the tray table extends horizontally across the seat for passenger use. Each tray table is partially padded on its underside to provide shoulder support to the occupying passenger when in the stowed configuration.

In some embodiments, each armrest includes a slide bar set thereinto and extending lengthwise between a back and a forward end. The tray table and extender are slidably attached to the armrest via bushings capable of translating lengthwise along the slide bar, allowing the tray table to translate therewith.

In some embodiments, the tray table pivots between the stowed and deployed configurations when the bushings reach the forward end of the slide bar.

In some embodiments, the armrest is positioned between two adjacent passenger seats, e.g., a left-side and right-side seat (the armrest may be attached to either seat). The armrest includes left-side and right-side slide bars on its underside, each slide bar facing an adjacent seat and including a bushing translating along the slide bar. Left-side and right-side tray tables are attached to the respective left-side and right-side bushings; the left-side and right-side tray tables extend across the left-side and right-side seats when deployed.

In some embodiments, each tray table pivots between stowed and deployed configurations by rotating relative to a lengthwise axis aligned with its associated armrest.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
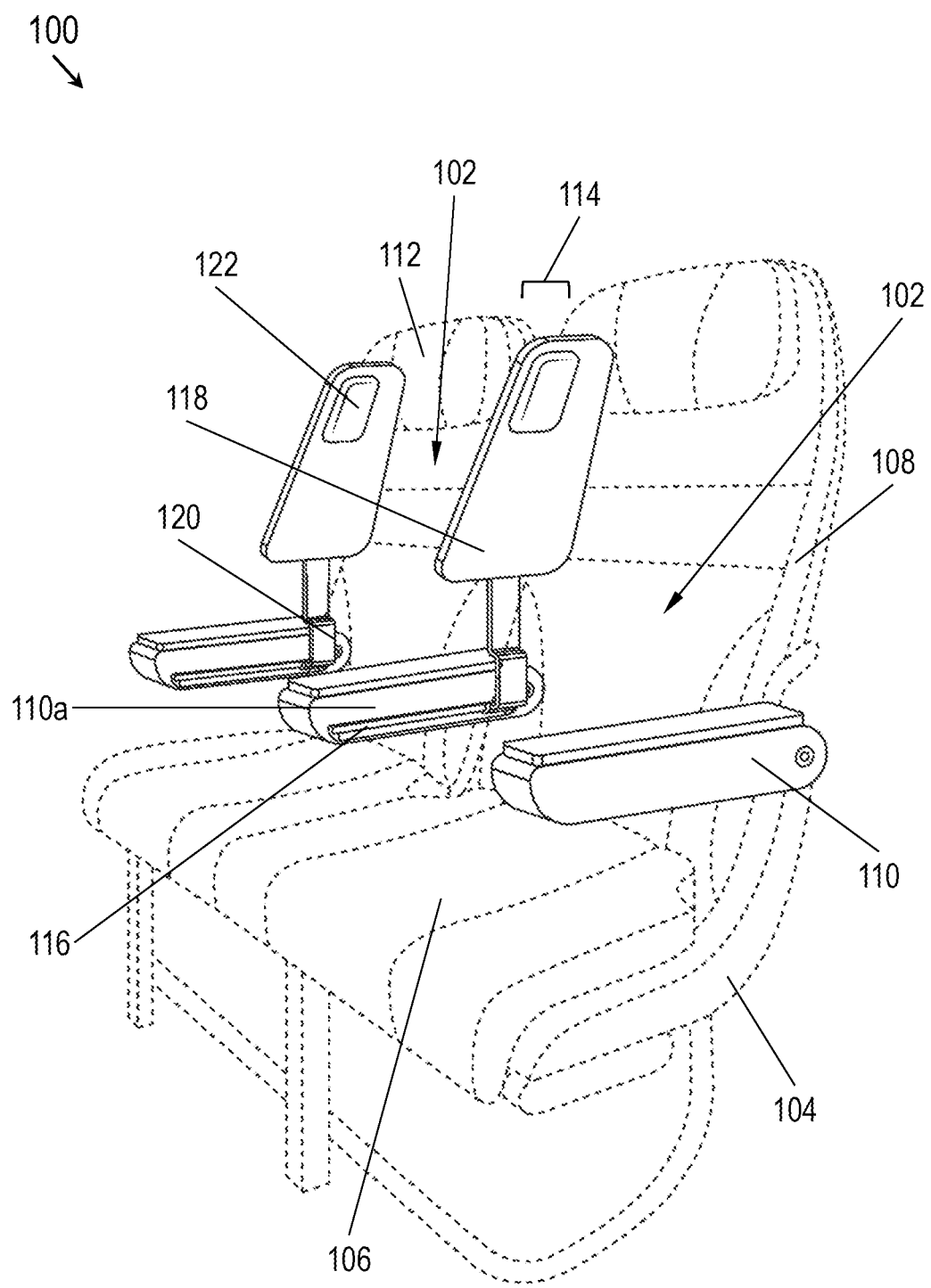
FIG. 1A is an isometric view of a passenger seating assembly with stowed tray tables according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1B:
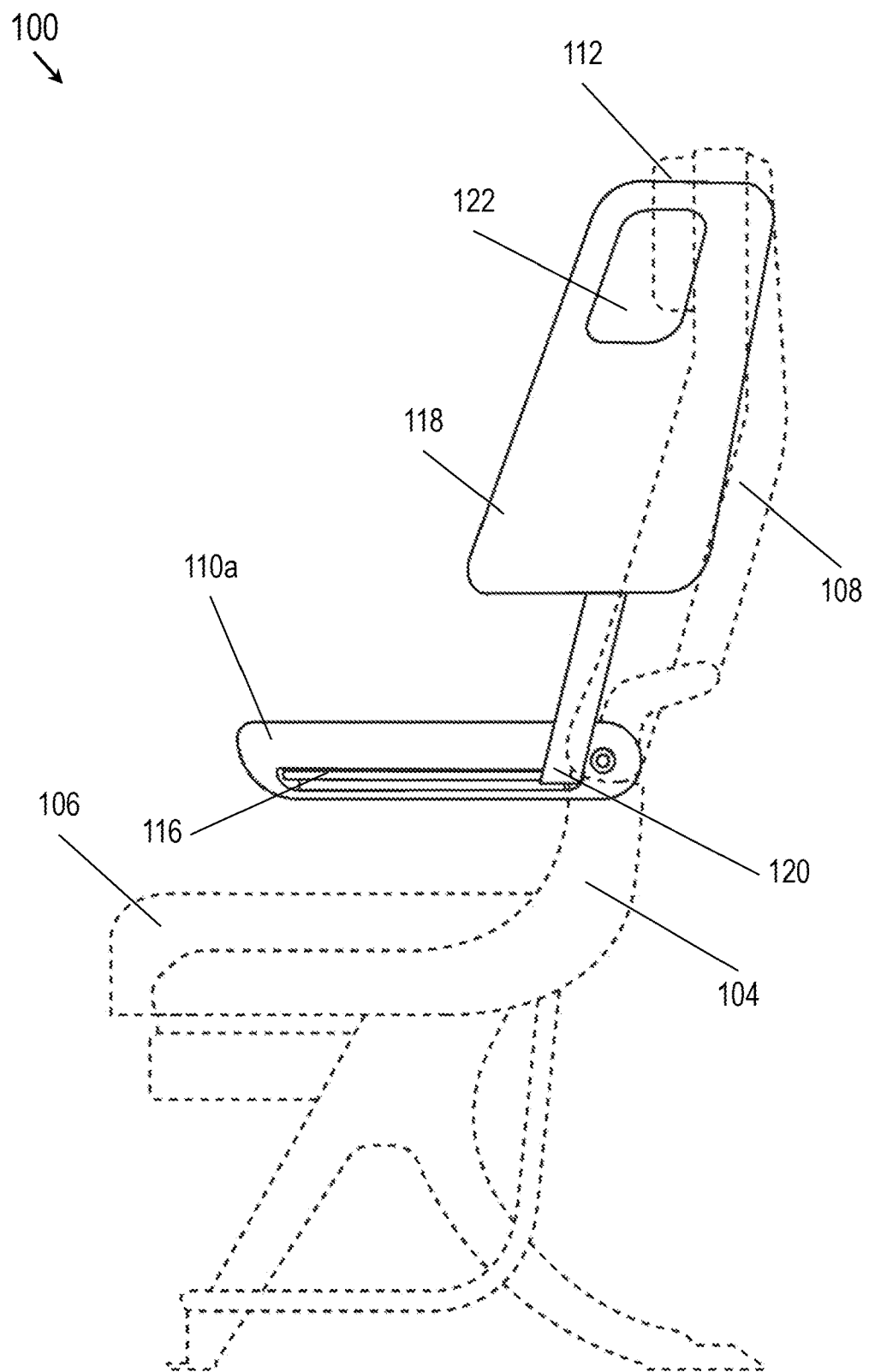
FIG. 1B is a profile view of the passenger seating assembly of FIG. 1A.

Referring to FIGS. 1A and 1B, a passenger seating assembly 100 is disclosed. The passenger seating assembly 100 may include a group of passenger seats 102, each passenger seat including a seat frame 104, seat cushion 106, seatback 108, and armrests 110.

In embodiments, the passenger seating assembly 100 may include several individual passenger seats 102 (e.g., generally between two and five economy-class or coach-class seats, depending on aircraft size and passenger cabin layout), each passenger seat capable of accommodating a single passenger. For example, each passenger seat 102 may include a seat frame 104 supporting a seat cushion 106. In some embodiments, seat frame elements may be shared by more than one passenger seat 102, e.g., a single seat frame 104 supporting multiple seat cushions 106. Each passenger seat 102 may have a seatback 108 pivotably attached to the seat frame 104. For example, the seatback 108 may be configured to recline relative to the seat frame 104 and seat cushion 106, and may terminate in a headrest 112 capable of supporting the passenger's head.

The level of privacy between two adjacent passenger seats 102 may be relatively small. For example, two adjacent passenger seats 102 may share a common armrest 110a between them, and the gap (114) between two adjacent seatbacks 108 may be relatively small. Accordingly, in embodiments each passenger seat 102, of the two armrests 110 adjacent thereto, may have in one armrest 110a a runner bar 116 (e.g., slide bar) set into its underside. For example, the runner bar 116 may extend for substantially the length of the armrest 110a.

In embodiments, a tray table 118 may be attached to each runner bar 116 by an extender 120, and may be transitionable between the stowed configuration shown by FIGS. 1A-B to a deployed configuration extending substantially across the adjacent passenger seat 102 (best shown below by FIG. 3). For example, each passenger seat 102 may have only one tray table 118 accessible by the passenger seated therein. Accordingly, some armrests 110 (e.g., an outboard armrest adjacent to an aircraft bulkhead) may not include the runner bar 116 or tray table 118.

In embodiments, the tray table 118 may, in the stowed configuration shown by FIGS. 1A-B, be partially obscured by the seatbacks 108. For example, a portion of the tray tables 118 may extend into the gap 114 between two adjacent passenger seats 102, providing additional privacy for the occupying passengers. Similarly, a portion of the tray tables 118 may extend behind the seatbacks 108 between the two adjacent seats. In some embodiments, the tray table 118 may incorporate padding material 122 on its underside, such that when the tray table is in the stowed configuration, the padding material may serve as a padded rest for a shoulder or head of the occupying passenger.

Figure 2A:
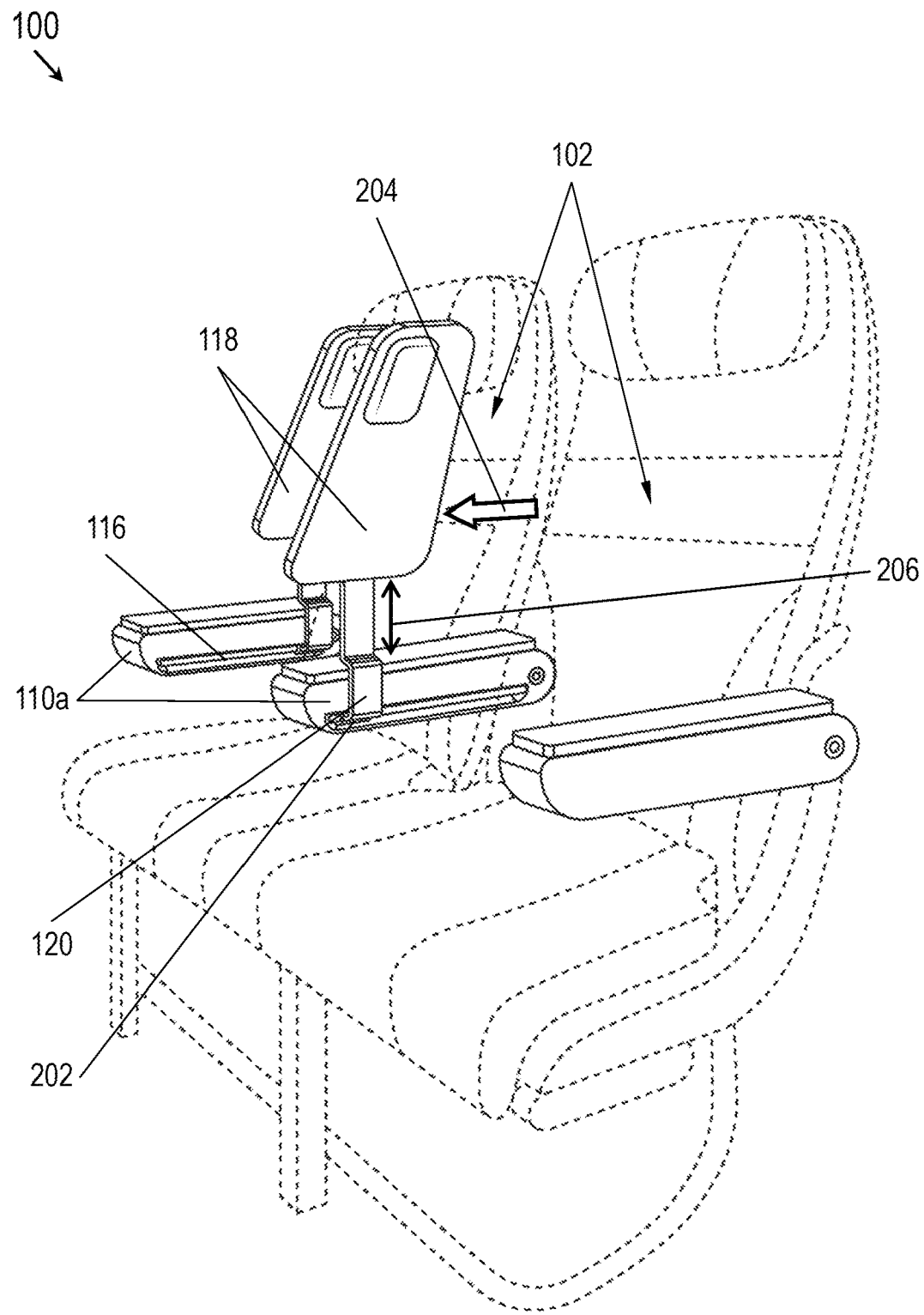
FIG. 2A is an isometric view of the passenger seating assembly of FIG. 1A with partially deployed tray tables.
Figure 2B:
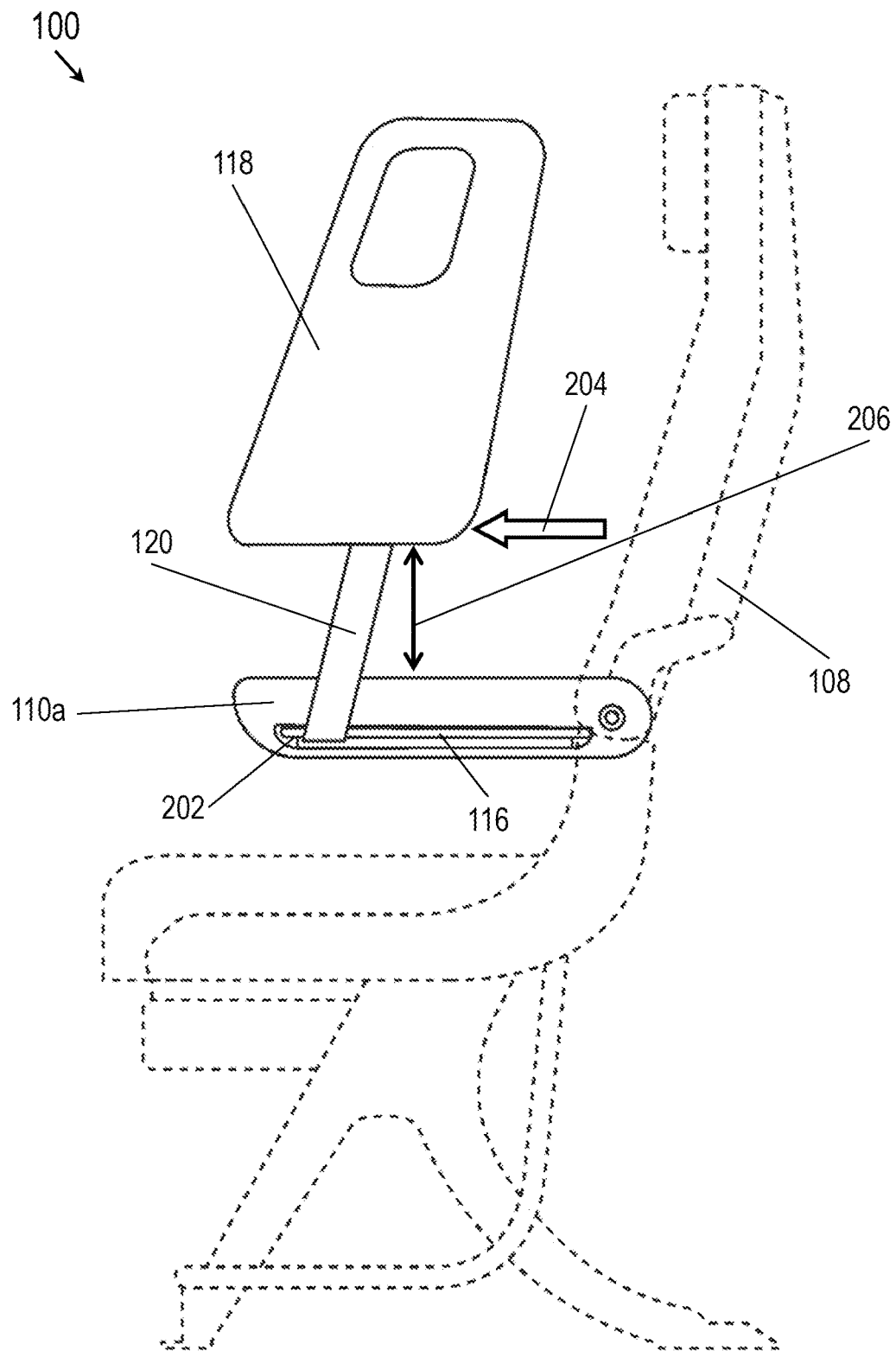
FIG. 2B is a profile view of the passenger seating assembly of FIG. 2A.

Referring to FIGS. 2A and 2B, the passenger seating assembly 100 is disclosed.

In embodiments, the tray tables 118 may be attached to the runner bars 116 by extenders 120 and bushings 202 (e.g., carriages), the bushings capable of translating (204) along the length of the runner bars. For example, the tray tables 118 may be pulled out (e.g., by a passenger occupying the passenger seat 102) from the stowed configuration (shown by FIGS. 1A-B) to a partially stowed configuration, e.g., wherein the tray tables 118 may still be vertically oriented but not obscured by the seatbacks 108.

In embodiments, the extenders 120 connecting the tray tables 118 to the bushings 202 may be of sufficient length to provide a gap 206 between the stowed (or partially stowed) tray tables and their associated armrests 110a. For example, the gap 206 may be sufficiently large to allow the passenger to rest an elbow therein upon the armrest 110a.

Figure 3:
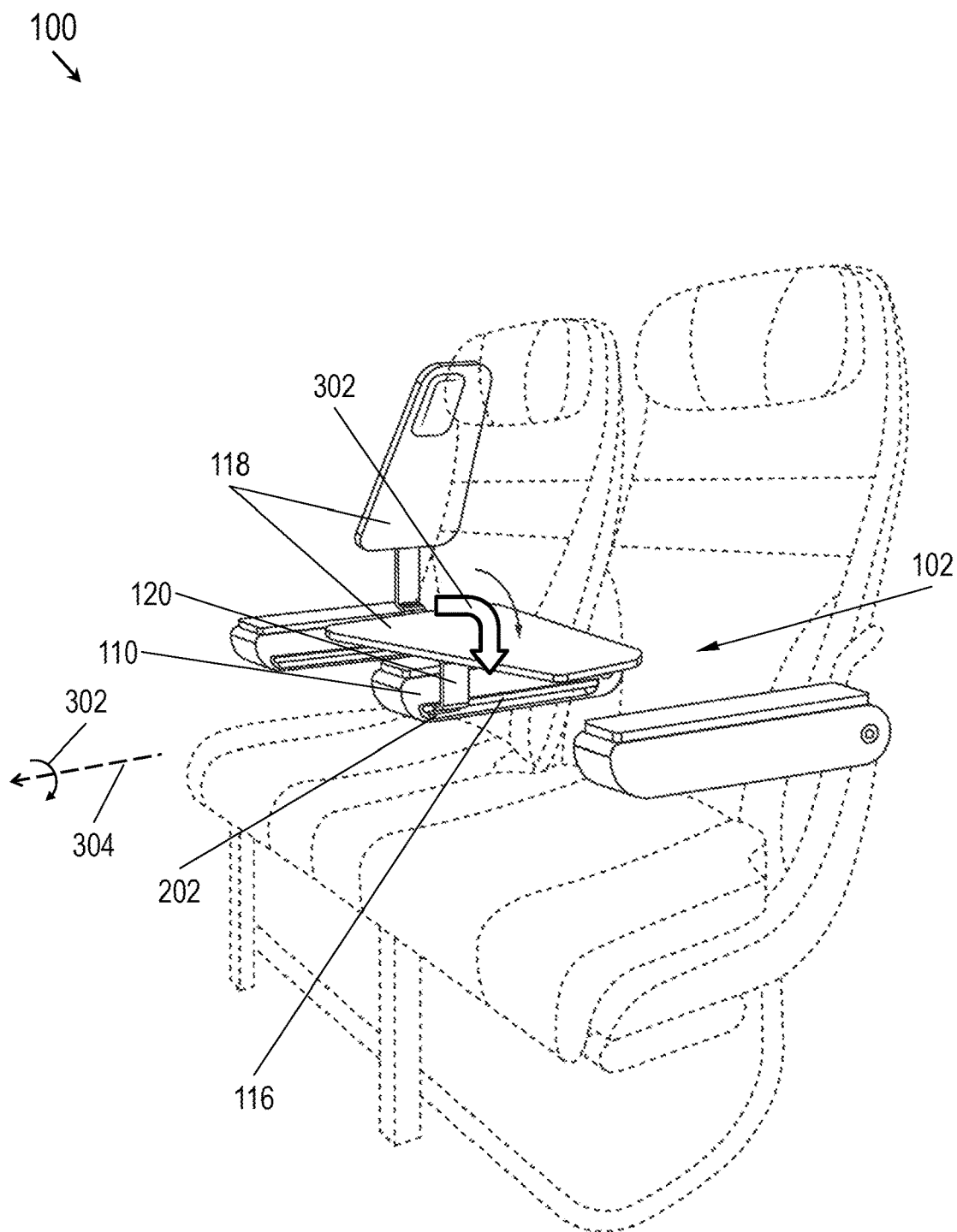
FIG. 3 is an isometric view of the passenger seating assembly of FIG. 1A with a fully deployed tray table.

Referring to FIG. 3, the passenger seating assembly 100 is disclosed.

In embodiments, the tray tables 118 and extenders 120 may be pivotably attached to the bushings 202, such that the tray tables (e.g., once translated (204, FIGS. 2A-B) to the forward end of the runner bars 116) may be pivoted (302) to a fully deployed configuration. For example, when fully deployed each tray table 118 may extend substantially horizontally across its associated passenger seat 102. The deploying tray tables 118 may pivot (302) between the stowed and deployed configurations relative to a lengthwise axis 304, e.g., a rotational axis aligned with the armrest 110 and/or the runner bars 116.

In embodiments, each fully deployed tray table 118 may be returned to the stowed configuration (e.g., as best shown by FIGS. 1A-B) by pivoting the tray table upward (e.g., relative to the lengthwise axis 304) into a substantially vertical orientation and sliding the tray table backwards along the runner bar 116. In some embodiments, the tray tables 118 and extenders 120 may be pivotable between the stowed and fully deployed configurations before the bushings 202 reach the forward ends of the runner bars 116.

Figure 4A:
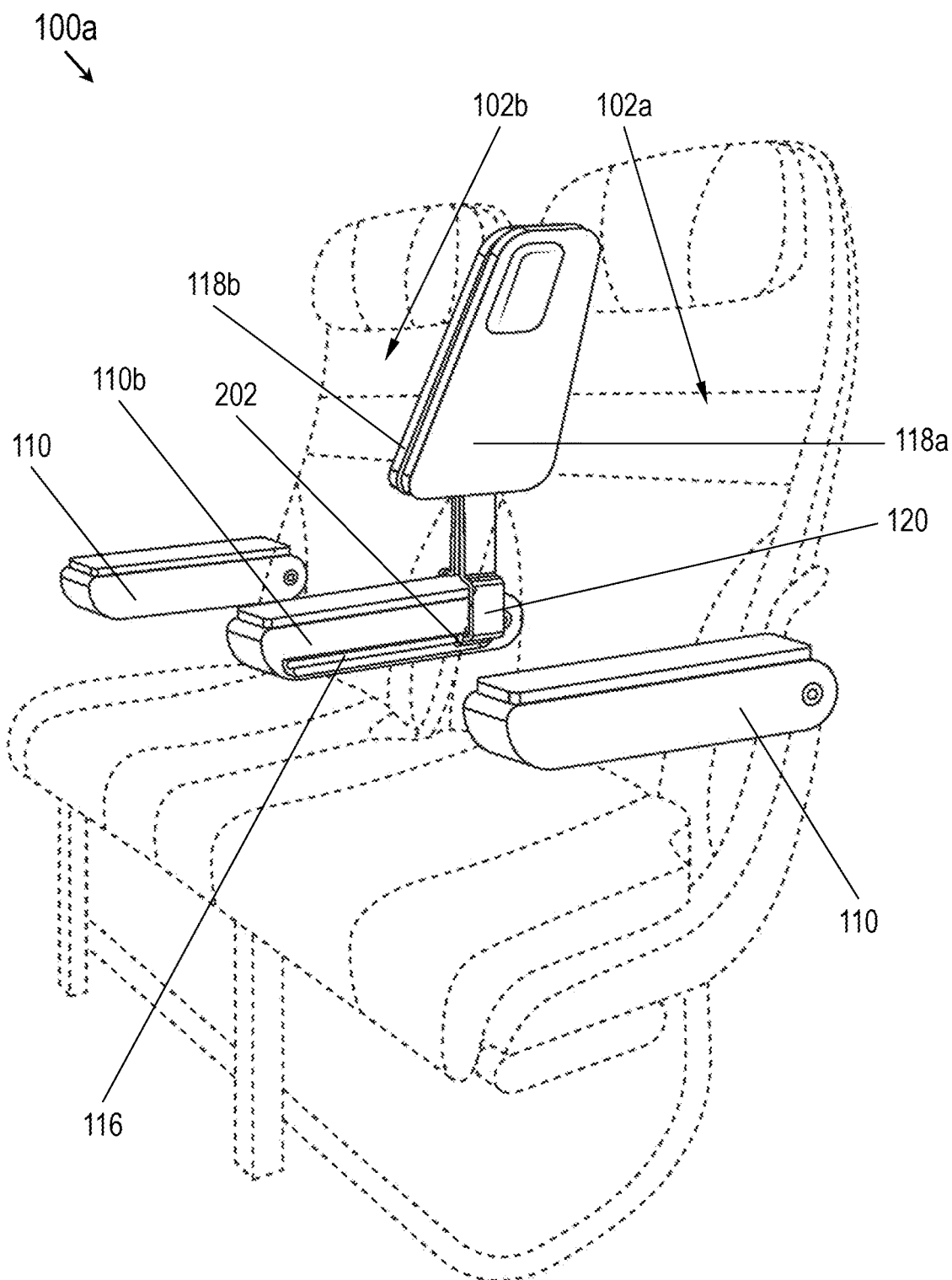
FIG. 4A is an isometric view of the passenger seating assembly of FIG. 1A in an alternative configuration.

Referring to FIG. 4A, the passenger seating assembly 100a may be implemented and may function similarly to the passenger seating assembly 100 of FIGS. 1A through 3. except that the passenger seating assembly 100a may incorporate, in addition to the armrests 110, an armrest 110b having runner bars on both sides, e.g., a runner bar 116 facing the passenger seat 102a and a runner bar (not shown) facing the passenger seat 102b.

Figure 4B:
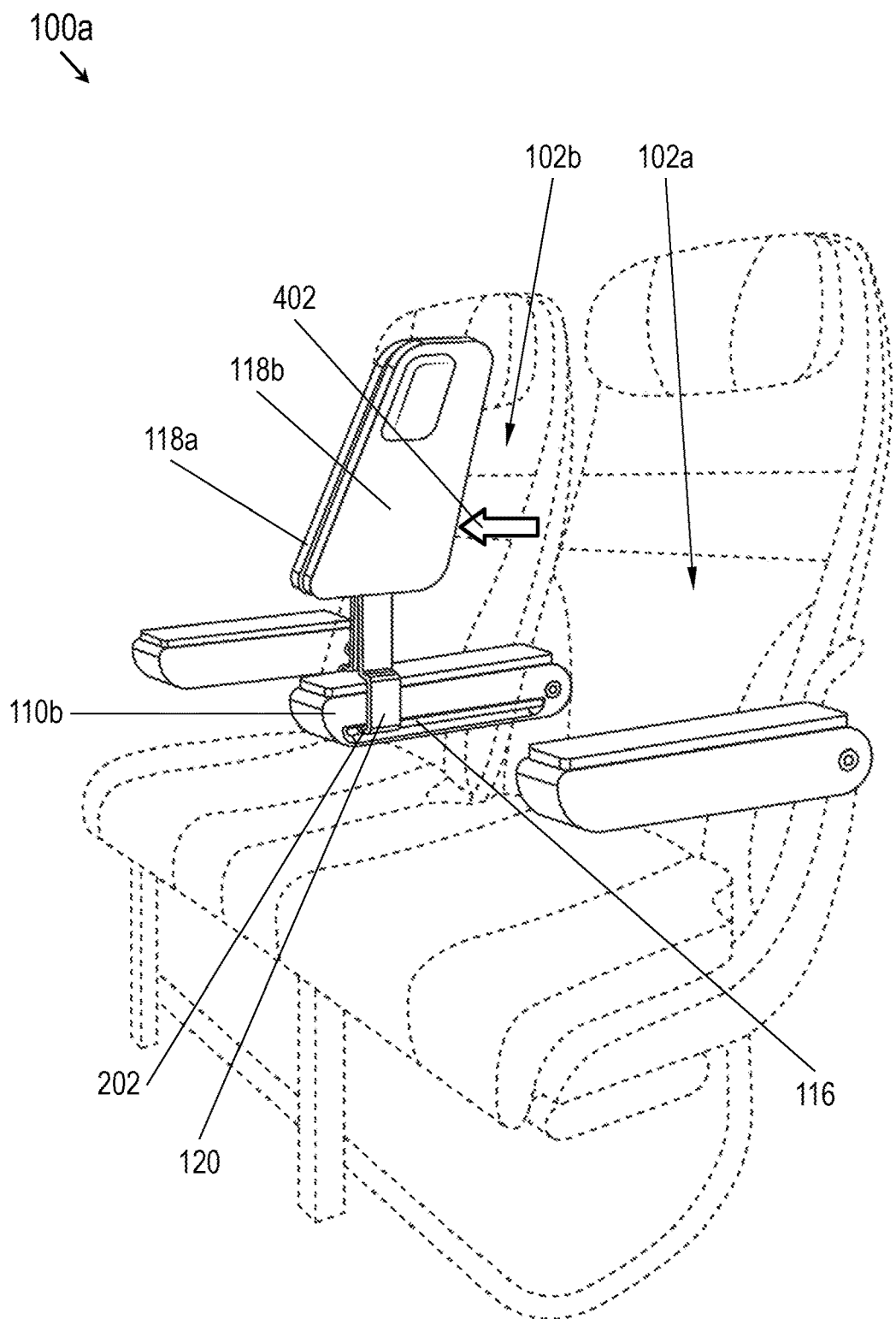
FIG. 4B is an isometric view of the passenger seating assembly of FIG. 4A with partially deployed tray tables.

In embodiments, tray tables 118a-b may each be connected to the armrest 110b (in particular, to the runner bars 116 set thereinto). For example, referring also to FIG. 4B, the tray tables 118a-b may slide forward (402) into a partially deployed configuration (e.g., via the extenders 120 and bushings 202 set into the runner bars 116).

Figure 4C:
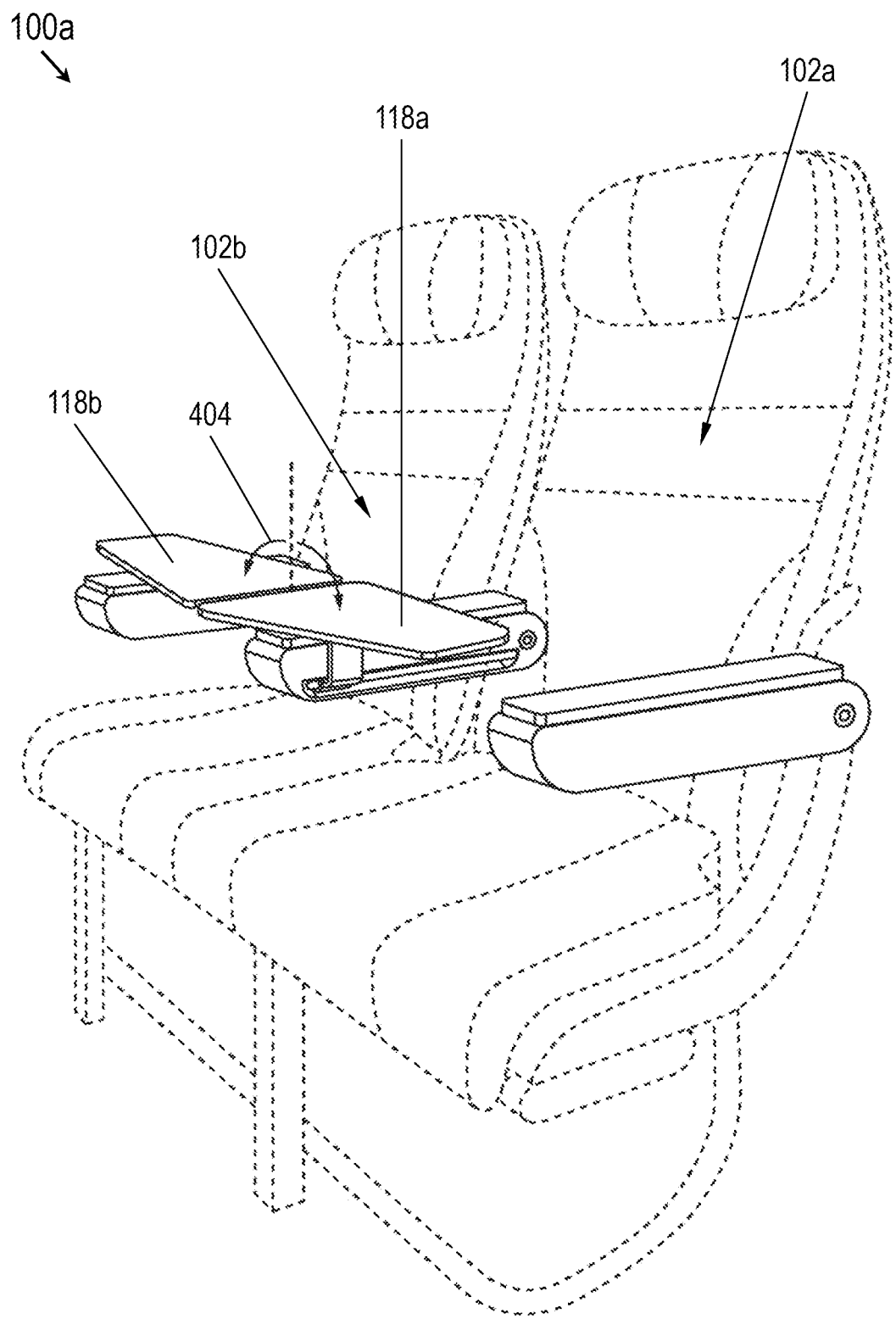
FIG. 4C is an isometric view of the passenger seating assembly of FIG. 4A with fully deployed tray tables.

In embodiments, referring also to FIG. 4C, the tray tables 118a-b may pivot (e.g., from the partially deployed configuration shown by FIG. 4B) in opposite directions (404) into fully deployed configurations, extending substantially across the passenger seats 102a-b respectively (e.g., for use by a left-handed passenger occupying the passenger seat 102b).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A passenger seat with a vertically stowed tray table, comprising:
   a seat frame mountable to a floor of an aircraft cabin;
   a seatback pivotably mountable to the seat frame, the seatback and the seat frame collectively configured to accommodate a passenger;
   at least one armrest attached to the seatback on the left or right side;
   at least one runner bar set into an underside of the armrest and extending between a back end and a forward end;
   at least one bushing configured to translate lengthwise between the back end and the forward end of the runner bar;
   at least one tray table slidably attached to the armrest by an extender defining a space between the tray table and the armrest, the extender attached to the armrest via the at least one bushing, the tray table configured to:
   translate lengthwise along the armrest; and
   pivot between a stowed configuration and a deployed configuration, the stowed configuration associated with a substantially vertical orientation above the armrest and proximate to the seatback, the deployed configuration associated with a substantially horizontal orientation extending partially across the passenger seat;
   the tray table including a partially padded underside configured to support the passenger when in the stowed configuration.

2. The passenger seat of claim 1, wherein the tray table is configured to pivot between the stowed configuration and the deployed configuration when the bushing reaches the forward end of the runner bar.

3. The passenger seat of claim 1, wherein the partially padded underside is configured to support at least one of a head and a shoulder of the passenger.

4. The passenger seat of claim 1, wherein the tray table is partially obscured between the passenger seat and an adjacent passenger seat when in the stowed configuration.

5. The passenger seat of claim 1, wherein the space is capable of accommodating an elbow of the passenger.

6. The passenger seat of claim 1, wherein the tray table is configured to pivot between the stowed configuration and the deployed configuration by rotating relative to an axis aligned with the armrest.

7. A passenger seating assembly, comprising:
a support frame mountable to a floor of an aircraft cabin;
a plurality of seatbacks pivotably attached to the support frame, each seatback associated with a passenger seat configured to accommodate a passenger;
a plurality of armrests attached to the plurality of seatbacks, the plurality of armrests including at least one first armrest comprising:
   at least one runner bar set into an underside of the first armrest and extending between a back end and a forward end;
   and
   at least one bushing configured to translate lengthwise between the back end and the forward end of the runner bar;
and
at least one tray table slidably attached to the first armrest by an extender defining a space between the tray table and the armrest, the extender attached to the first armrest via the at least one bushing, the at least one tray table configured to:
   translate lengthwise along the first armrest;
   and
   pivot between a stowed configuration and a deployed configuration, the stowed configuration associated with a substantially vertical orientation above the first armrest and proximate to the seatback, the deployed configuration associated with a substantially horizontal orientation extending partially across the associated passenger seat,
   the tray table including a partially padded underside configured to support the passenger when the tray table is in the stowed configuration.

8. The passenger seat of claim 7, wherein the tray table is configured to pivot between the stowed configuration and the deployed configuration when the bushing reaches the forward end of the runner bar.

9. The passenger seat of claim 7, wherein:
the first armrest is disposed between a left-side passenger seat and a right-side passenger seat;
the at least one runner bar includes a left-side runner bar and a right-side runner bar;
the at least one bushing includes a left-side bushing associated with the left-side runner bar and a right-side bushing associated with the right-side runner bar;
and
the at least one tray table includes:
   a left-side tray table attached to the left-side bushing, the left-side tray table configured to extend partially across the left-side seat when in the deployed configuration;
   and
   a right-side tray table attached to the right-side bushing, the right-side tray table configured to extend partially across the right-side seat when in the deployed configuration.

10. The passenger seat of claim 7, wherein the tray table is configured to pivot between the stowed configuration and the deployed configuration by rotating relative to an axis aligned with the first armrest.

* * * * *